Patented May 8, 1928.

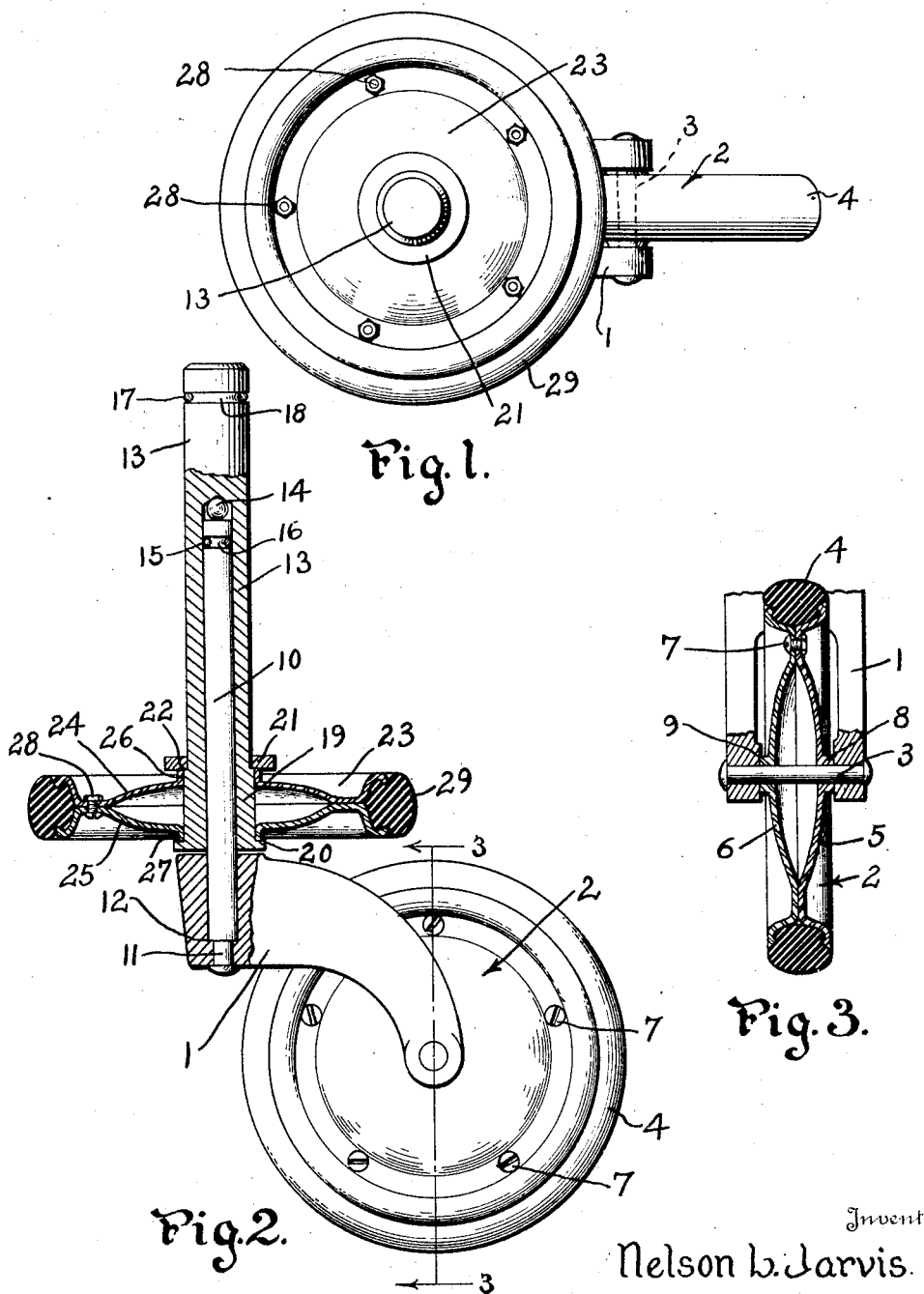

1,669,165

UNITED STATES PATENT OFFICE.

NELSON L. JARVIS AND FRANK J. JARVIS, OF PALMER, MASSACHUSETTS, ASSIGNORS TO JARVIS & JARVIS, INC., OF PALMER, MASSACHUSETTS, A CORPORATION OF MASSACHUSETTS.

CASTER.

Application filed December 22, 1925. Serial No. 76,990.

This invention relates to roller casters, and more particularly to roller casters having an auxiliary or buffer roller.

The principal object of the invention is to provide a caster having the regular roller and in addition thereto a buffer or bumper roller that will prevent the object to which the caster is applied from coming in contact with walls or base boards in the room in which it is used or with furniture or other articles.

Other objects are to provide an improved construction of shell frame rollers and bumper rollers, improved means of securing the rubber tire in the roller, improved friction means for holding the stem and caster sleeve, and improved bearing means of the stem in the sleeve.

Another object is to provide an economic, light, strong, easily working and efficient caster.

The invention provides these and other objects which will become apparent from the drawings and the following description. The preferred form only of the invention is shown by way of illustration. Many changes of the details of construction and the arrangement of parts may be made without departing from the spirit of the invention as expressed in the claims and as such are a part of the invention. We, therefore, do not desire to be limited to the specific details shown and described.

Referring to the drawings in which similar reference characters designate similar parts throughout:

Figure 1 is a top or plan view of the caster.

Figure 2 is an elevation thereof partly in section.

Figure 3 is a section on line 3—3 of Figure 2.

The main roller support 1 is bifurcated in the form of a fork. The caster roller 2 is located between the bifurcations of the support and rotatably secured thereto by the axle pin 3. The caster roller 2 comprises a rubber tire 4 held between the two halves 5 and 6 of the body of the roller. The parts 5 and 6 are made of thin plates bent to shape and held together by the rivets 7. The drawing of the plates together by the rivets clamps the rubber tire and holds it in place.

The inner portion of the plates 5 and 6 is flanged at 8 and 9 to form a bearing surface for the roller on the axle pin 3.

Rising from the roller support 1 is the caster stem 10 which has a reduced shank 11 forming a shoulder 12 which bears on the inner walls of the opening in the roller support. The outer end of the shank 11 is riveted over the roller support, thus rigidly securing the stem to the roller support. Over the caster stem 10 is fitted the caster sleeve 13 which has a central bore into which the stem is slipped, the central bore terminating a short distance beyond the end of the stem. Between the end of the stem and the end of the central bore is placed a ball 14 which acts as a thrust bearing for the sleeve on the stem. The sleeve 13 is rotatable on the stem 10. The sleeve 13 is frictionally held on the stem 10 by a friction spring 15 in a groove 16 in the stem 10. The ends of the spring do not quite meet, hence the spring expands and engages the sides of the bore in the sleeve preventing the stem from slipping longitudinally in the bore. On the outside of the caster sleeve 13 is a similar spring 17 in the groove 18 designed to hold the caster sleeve in the object to which the caster is applied.

On its lower end the caster sleeve 13 has a bearing hub or boss 19 having the shoulder 20 at one end and the washer 21 on the other forming the ends of the bearing. The washer 21 rests on the shoulder 22 and is screwed to or otherwise secured to the caster sleeve to retain it in place on the shoulder 22. On the bearing 19 between the shoulder 20 and the washer 21 is rotatably mounted the bumper wheel 23, similar in construction to the roller wheel 2, comprising the body plates 24 and 25 having the bearing flanges 26 and 27 bearing on the hub or boss 19 of the caster sleeve 13, and held together by the rivets 28 and embracing the rubber tire 29.

The operation of the caster is as follows: The caster sleeve 13 is held in the object to which it is applied by the friction spring 17. The caster stem 10 is held in the caster sleeve 13 by the friction spring 15; relative rotative movement between the stem 10 and sleeve 13 is permitted by the fit of the stem into the bore of the sleeve and by means of the ball thrust bearing 14 between the end of the stem and the end of the bore in the sleeve. The roller support 1 moves with the stem and the roller 2 rotates on the axle pin 3 secured to the roller support. The bumper wheel 23 rotates on its bearing on the caster sleeve 13 and projects far enough beyond the object to which the caster is attached to prevent the object coming in contact with other objects in its vicinity. The washer 21 holds the bumper roller 23 in place on its bearing. The floor roller and the bumper roller are in planes at right angles to each other.

From the foregoing description it will be seen that we have provided a simple, light, economic and efficient device for carrying forth the objects and advantages herein set forth, as well as for other purposes.

Having described our invention, we claim:

1. In a device of the character described, a roller support, a caster stem secured to the roller support, a caster sleeve rotatably mounted on the stem and having a flange adjacent the support and a bearing surface adjacent to the flange, a bumper roller rotatably mounted on the bearing portion of the sleeve and a spacer member to hold the bumper roller on the bearing on the sleeve.

2. In a device of the character described, a roller support, a caster stem secured to the support and projecting beyond the same, a caster sleeve having an internal bore rotatably mounted on the caster stem and having a flange abutting the support and a bearing surface adjacent the flange, a ball member in the bore of the caster sleeve between the end of the caster stem and the bore in the caster sleeve, a bumper member rotatably mounted on the bearing surface of the caster sleeve and a spacer member on the caster sleeve beyond the bumper to hold the bumper in place on the bearing on the sleeve and to prevent the bumper from coming in contact with the article in which the caster sleeve is secured.

NELSON L. JARVIS.
FRANK J. JARVIS.